United States Patent Office 3,346,454
Patented Oct. 10, 1967

3,346,454
17-ALKYL-19-NOR - $\Delta^{4,9,11}$-PREGNATRIENE-3,20-DI-
ONES, PROCESS AND INTERMEDIATES FOR
PREPARING SAME AND THERAPEUTIC COM-
POSITIONS THEREOF
Robert Bucourt, Clichy-sous-Bois, André Pierdet, Noisy-
le-Sec, Jean Tessier, Vincennes, and Germain Cos-
terousse, Montrouge, France, assignors to Roussel-
Uclaf, Paris, France, a corporation of France
No Drawing. Filed Oct. 26, 1965, Ser. No. 505,243
Claims priority, application France, Nov. 4, 1964,
993,811; May 3, 1965, 15,549
10 Claims. (Cl. 167—74)

The invention relates to novel 19-nor-$\Delta^{4,9,11}$-steroids of the formula

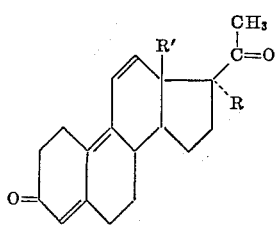

wherein R and R' are lower alkyl of 1 to 4 carbon atoms and to a novel process for their preparation. The invention also relates to novel therapeutic compositions.

The compounds of Formula I possess interesting physiological properties and at least one of the following physiological activities; progestomimetic activity, progestative activity, anti-androgenic activity and anti-estrogenic activity. 17α - methyl-19-nor-$\Delta^{4,9,11}$-pregnatriene-3,20-dione is particularly interesting as it has important progestative and progestomimetic activities.

It is an object of the invention to provide the novel 19-nor-$\Delta^{4,9,11}$-steroids of Formula I.

It is another object of the invention to provide a novel process for the preparation of the 19-nor-$\Delta^{4,9,11}$-steroids of Formula I.

It is a further object of the invention to provide novel intermediates for the 19-nor-$\Delta^{4,9,11}$-steroids of Formula I.

It is an additional object of the invention to provide novel therapeutic compositions.

These and other objects and advantages of the invention will become obvious from the following detailed description.

The novel 19-nor-$\Delta^{4,9,11}$-steroids of the invention have the formula

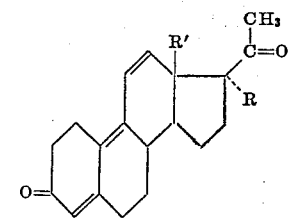

wherein R and R' are lower alkyl of 1 to 4 carbon atoms. Examples of said compounds are 17α-methyl-19-nor - $\Delta^{4,9,11}$ - pregnatriene - 3,20 - dione, 17α-ethyl-19-nor-$\Delta^{4,9,11}$ - pregnatriene - 3,20-dione, 17α-butyl-19-nor-$\Delta^{4,9,11}$-pregnatriene - 3,20 - dione, 17α - methyl-18,19-dinor-13β-ethyl-$^{4,9,11}$-pregnatriene-3,20-dione, etc.

The novel process of the invention for the preparation of 19-nor-$\Delta^{4,9,11}$-pregnatrienes of Formula I comprises reacting 5 - methoxy - 13β - R'-des A-18,19-dinor-$\Delta^{5,7,9,16}$-pregnatetraene-20-one wherein R' has the above definition with an alkyl halide wherein the alkyl is R of the above definition in the presence of a metal selected from the group consisting of alkali metals and alkaline earth metals in liquid ammonia to form 5-methoxy-13β-R'-17α-R-des A - 18,19 - dinor - $\Delta^{5,7,9}$-pregnatriene-20-one, reducing the latter with a mixed metal hydride to form 5-methoxy-13β-R'-17α-R-des, A-18,19-dinor-$\Delta^{5,7,9}$-pregnatriene-20-ol, subjecting the latter to a Birch reduction followed by mild acidic hydrolysis to form 13β-R'-17α-R-des A-18,19-dinor-$\Delta^8$-pregnene-20-ol-5-one, reacting the latter with a concentrated mineral acid to form 13β-R'-17α-des A-18,19-dinor-$\Delta^9$-pregnene-20-ol-5-one, esterifying the latter to form 13β-R'-17α-R-des A-18,19-dinor-20-acyloxy-$\Delta^9$-pregnene-5-one wherein the acyl radical is derived from an organic carboxylic acid of 1 to 18 carbon atoms, reacting the latter with a cyclic amine of the formula

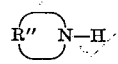

wherein R'' is an alkylene of 4 to 7 carbon atoms to form the corresponding 5-enamino-13β-R'-17α-R-des A-18,19-dinor-20-acyloxy-$\Delta^{5(10),9(11)}$-pregnadiene, condensing the latter with 1,3-dichloro-2-butene to form 3-chloro-13β - R' - 17α - R - 20-acyloxy-4,5-seco-18,19-dinor-$\Delta^{2,9}$-pregnadiene-5-one, converting the latter into its enolic acetate, brominating the latter to form 3-chloro-11-bromo - 13β - R'-17α-R-20-acyloxy-4,5-seco-18,19-dinor-$\Delta^{2,9}$-pregnadiene-5-one, dehydrobrominating the latter to form 3 - chloro - 13β-R'-17α-R-20-acyloxy-4,5-seco-18,19-dinor-$\Delta^{2,9,11}$-pregnatriene-5-one, saponifying the latter to form 3 - chloro-13β-R'-17α-R-4,5-seco-18,19-dinor-$\Delta^{2,9,11}$-pregnatriene-20-ol-5-one, oxidizing the latter to form 3-chloro - 13β-R'-17α-R-4,5-seco-18,19-dinor-$\Delta^{2,9,11}$-pregnatriene-5,20-dione, subjecting the latter to acid hydrolysis to form 13β-R'-17α-R-4,5-seco-18,19-dinor-$\Delta^{9,11}$-pregnadiene-3,5,20-trione and cyclizing the latter with a dehydrating agent to form the 13β-R'-17α-R-18,19-dinor-$\Delta^{4,9,11}$-pregnatriene-3,20-dione. The reaction scheme is illustrated in Table I.

TABLE I

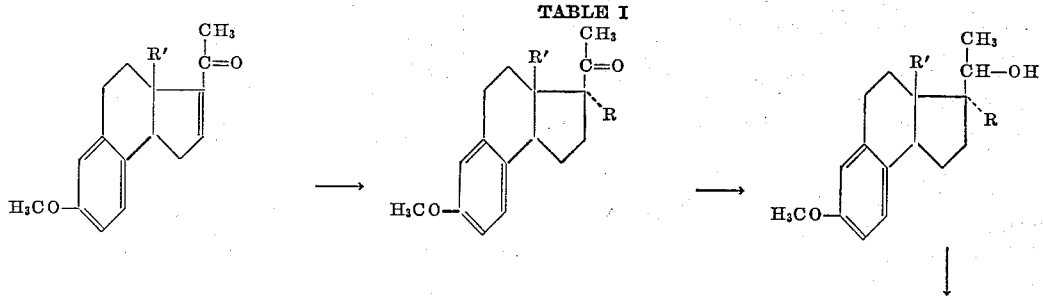

TABLE I—Continued

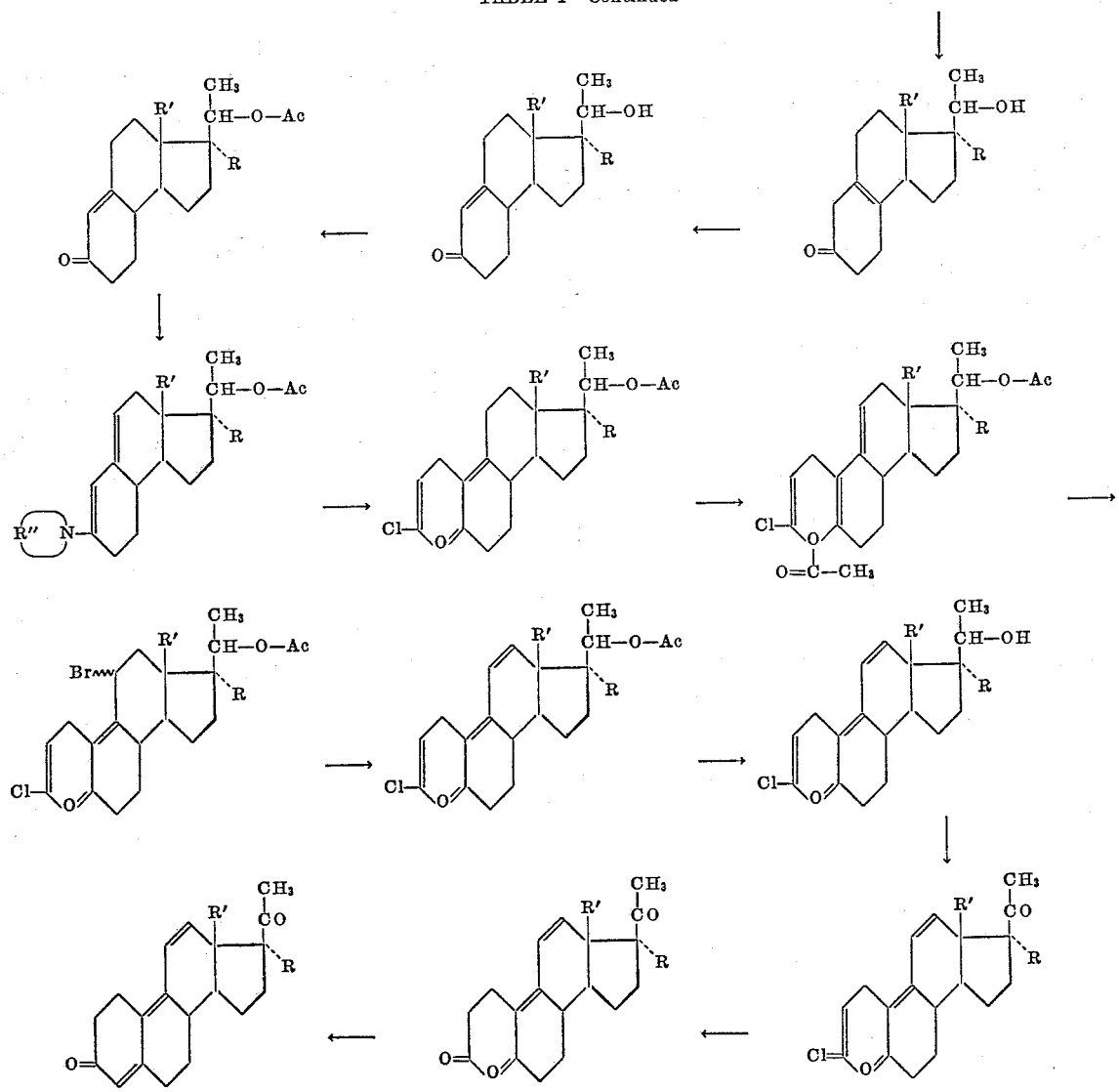

wherein R and R' are lower alkyl radicals of 1 to 4 carbon atoms, Ac is an acyl radical of an organic carboxylic acid of 1 to 18 carbon atoms and R'' is a lower alkylene radical of 4 to 7 carbon atoms.

The process of the invention is remarkable because the conversion of 5-methoxy-13β-R'-17α-R-des A-18,19-dinor-Δ$^{5,7,9}$-pregnatriene-20-ol into 13β-R$_2$-17α-R-des A-18,19-dinor-Δ$^9$-pregnene-20-ol-5-one is of necessity effected in three stages instead of in two as might be expected. In fact, in the course of the synthesis of 19-nor-Δ$^{4,9,11}$-pregnatriene-3,20-dione described in copending, commonly assigned United States patent application Ser. No. 401,657 filed Oct. 5, 1964, now U.S. Patent No. 3,313,703, 5-methoxy-des A-19-nor-Δ$^{5,7,9}$-pregnatriene-20-ol- is subjected to a Birch reduction followed by a hydrolysis with a concentrated mineral acid to obtain des A-19-nor-Δ$^9$-pregnene-20-ol-5-one directly. However, by applying this method to 5-methoxy-13β-R'-17α-R-des A-18,19-dinor-Δ$^{5,7,9}$-pregnatriene-20-ol, it was ascertained that the product was easily dehydrated probably as a result of an electrophile transposition of the 1-2 type on a level of carbon 20 and carbon 17 carriers of four substituents among which is the alkyl radical 17α-R.

It was discovered and this is an unforeseen incident of the process, that it was possible to avoid this disadvantageous dehydration by subjecting the product, resulting from the reduction according to the Birch method, first to a mild hydrolysis, which leads to the formation of a 13β-R'-17α-R-des A-18,19-dinor-Δ$^8$-pregnene-20-ol-5-one with the molecular structure in the 17-position being preserved and then subjecting the said product to the action of a concentrated mineral acid. Under these conditions it is remarkable that the 13β-R'-17α-R-des A-18,19-dinor-Δ$^9$-pregnene-20-ol-5-one is obtained without occurrence of the dehydration pointed out above.

A further characteristic feature of the process of the invention is established by the conversion of 3-chloro-13β - R' - 17α - R-20-acyloxy-4,5-seco-18,19-dinor-Δ$^{2,9,11}$-pregnatriene - 5 - one into 13β-R'-17α-R-4,5-seco-18,19-dinor-Δ$^{9,11}$-pregnadiene-3,5,20-trione. In fact, if the acid hydrolysis of the vinyl chlorine, according to the method described in United States patent application Ser. No. 401,657 is effected directly on the 3-chloro-13β-R'-17α-R-20-acyloxy-4,5-seco-18,19-dinor - Δ$^{2,9,11}$ - pregnatriene-5-one, the formation of dehydrated products is observed which results in a significant decline in yield probably as a result of an electrophile transposition of the 1-2 type on a level of 17 and 20 carbons because of the sensitization of the 20-O-acyl function due to the presence of the alkyl radical in the 17-position. However, in an unforeseen manner, it was discovered at present, that the grouping

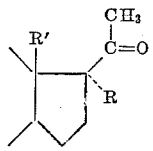

was stable in acid media which permitted the hydrolysis of the vinyl chlorine of 3-chloro-13β-R'-17α-R-4,5-seco-18,19-bis-nor-Δ$^{2,9,11}$-pregnatriene-5,20-dione and the said conversion could, therefore, be effected with excellent yields.

A preferred mode of the process of the invention comprises reacting 5-methoxy-13β-R'-des A-18,19-dinor-Δ$^{5,7,9,16}$-pregnatetraene-20-one wherein R' has the above definition with an alkyl iodide wherein the alkyl is R of the above definition in the presence of lithium in liquid ammonia to form 5-methoxy-13β-R'-17α-R-des A-18,19-dinor-Δ$^{5,7,9}$-pregnatriene-20-one, reducing the latter with an alkali metal borohydride such as potassium borohydride in an organic solvent such as lower alkanol to form 5 - methoxy - 13β - R' - 17α - R-des A-18,19-dinor-Δ$^{5,7,9}$-pregnatriene-20-ol, subjecting the latter to a Birch reduction followed by reaction with aqueous oxalic acid to form 13β-R'-17α-R-des A-18,19-dinor-Δ$^8$-pregnene-20-ol-5-one, reacting the latter with concentrated hydrochloric acid to form 13β-R'-17α-R-des A-18,19-dinor-Δ$^9$-pregnene-20-ol-5-one, esterifying the latter to form 13β-R'-17α - R - des A-18,19-dinor-20-acyloxy-Δ$^9$-pregnene-5-one wherein the acyl radical is derived from an organic carboxylic acid of 1 to 18 carbon atoms, reacting the latter with a cyclic amine of the formula

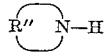

wherein R″ is an alkylene of 4 to 7 carbon atoms to form the corresponding 5-enamino-13β-R'-17α-R-des A-18,19-dinor-20-acyloxy-Δ$^{5(10),9(11)}$-pregnadiene, condensing the latter with 1,3-dichloro-2-butene to form 3-chloro-13β-R'-17α-R-20-acyloxy-4,5-seco-18,19 - dinor-Δ$^{2,9}$-pregnadiene-5-one, converting the latter into its enolic acetate, brominating the latter to form 3-chloro-11-bromo-13β-R'-17α-R - 20 - acyloxy - 4,5-seco-18,19-dinor-Δ$^{2,9}$-pregnadiene-5-one, dehydrobrominating the latter to form 3-chloro-13β-R'-17α-R-20-acyloxy-4,5-seco - 18,19 - dinor - Δ$^{2,9,11}$-pregnatriene-5-one, saponifying the latter to form 3 - chloro - 13β - R' - 17α - R-4,5-seco-18,19-dinor-Δ$^{2,9,11}$-pregnatriene-20-ol-5-one, oxidizing the latter with a sulfuric acid-chromic acid mixture to form 3-chloro-13β-R'-17α - R - 4,5 - seco - 18,19-dinor-Δ$^{2,9,11}$-pregnatriene-5,20-dione, hydrolyzing the latter with sulfuric acid to form 13β-R'-17α-R-4,5-seco-18,19 - dinor - Δ$^{9,11}$ - pregnadiene-3,5,20-trione and cyclizing the latter with a dehydrating agent to form the 13β-R'-17α-R-18,19-dinor-Δ$^{4,9,11}$-pregnatriene-3,20-dione.

The starting materials for the process of the invention may be made by the general process of application Ser. No. 401,657 which comprises condensing an alkali metal cyanide with a 5-methoxy-13β-R'-des A-18,19-dinor-Δ$^{5,7,9}$-androstatriene-17-one to form 5-methoxy-13β-R'-17α-cyano-des A-18,19-dinor-Δ$^{5,7,9}$-androstatriene-17β-ol, reacting the latter with a dehydrating agent to form 5 - methoxy - 13β-R'-17-cyano-des A-18,19-dinor-Δ$^{5,7,9,16}$-androstatetraene and reacting the latter with a methyl magnesium halide to form 5-methoxy-13β-R'-des A-18,19-dinor-Δ$^{5,7,9,16}$-pregnatetraene-20-one.

The therapeutic compositions of the invention are comprised of at least one 19-nor-Δ$^{4,9,11}$-steroid of the formula

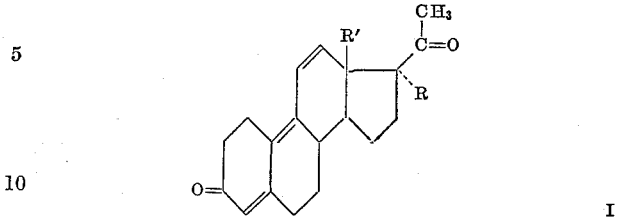

I wherein R and R' are lower alkyl of 1 to 4 carbon atoms and a major amount of a pharmaceutical carrier. The compositions may be in the form of injectable solutions or suspensions, in ampoules or multiple dose flacons, in the form of implants, tablets, and suppositories prepared in the usual manner. The usual daily dosage is 5 to 25 mg. depending upon the method of administration.

The method of maintaining pregnancy in mammals comprises administering an effective amount of 17α-methyl-19-nor-Δ$^{4,9,11}$-pregnatriene-3,20-dione. The said product may be administered orally, perlingually, subcutaneously or rectally.

In the following example there are described several preferred embodiments to illustrate the invention. However, it should be understood that the invention is not intended to be limited to the specific embodiments.

EXAMPLE.—PREPARATION OF 17α-METHYL-19-NOR-Δ$^{4,9,11}$-PREGNATRIENE-3,20-DIONE

*Step A: Preparation of 5-methoxy-17α-methyl-des A-19-nor-Δ$^{5,7,9}$-pregnatriene-20-one*

Over a period of 15 minutes, 270 mg. of lithium were added to 250 cc. of anhydrous ammonia condensed at a temperature of −75° C., and the suspension was agitated for 1 hour under an atmosphere of nitrogen. Then 250 cc. of ether were added thereto over a period of 25 minutes and then very slowly a solution of 5 gm. of 5-methoxy-des A-19-nor-Δ$^{5,7,9,16}$-pregnatetraene-20-one in 70 cc. of ether was introduced. After agitating the reaction mixture for 10 minutes at a temperature of −75° C., 40 cc. of methyl iodide were added thereto and the agitation was continued for ½ hour more. The ammonia of the reaction mixture was removed with a tepid water bath while agitating for 30 minutes and then the reaction mixture was washed with water, dried and evaporated to dryness under vacuum. The residue obtained was dissolved in an ethanol-acetic acid mixture (10:1) and after 5.25 gm. of reagent T (trimethylacethydrazide ammonium chloride) were added, the mixture was refluxed for 1½ hours. After cooling, the mixture was poured into ice water, was neutralized by the addition of a 2 N sodium hydroxide solution and was extracted with ether. The organic phase was recovered, washed with water until the wash waters were neutral, dried and evaporated to dryness under vacuum.

The residue obtained was subjected to chromatography through silica gel and eluted with methylene chloride containing 1.5% of acetone to obtain 3.275 gm. (yield of 62%) of 5-methoxy-17α-methyl-des A-19-nor-Δ$^{5,7,9}$-pregnatriene-20-one which product was employed as such for the next step of the synthesis. This product was soluble in most of the organic solvents.

The starting product, 5-methoxy-des A-19-nor-Δ$^{5,7,9,16}$-pregnatetraene-20-one was prepared according to the process described in United States patent application Ser. No. 401,657, filed October 5, 1964.

*Step B: Preparation of 5-methoxy-17α-methyl-des A-19-nor-Δ$^{5,7,9}$-pregnatriene-20-ol*

3.22 gm. of 5-methoxy-17α-methyl-des A-19-nor-Δ$^{5,7,9}$-pregnatriene-20-one were dissolved in 160 cc. of ethanol and a solution of 3.22 gm. of potassium borohydride in 65 cc. of water was rapidly added under an atmosphere of nitrogen and under agitation. After agitation for 16 hours at room temperature, the reaction mixture was poured into ice water and the aqueous solution was saturated with sodium chloride and extracted with methylene chloride. The organic phase was recovered, washed with water until the wash waters were neutral, dried and evaporated to dryness under vacuum. The residue obtained was subjected to chromatograph through magnesium silicate and eluted with methylene chloride to obtain 2.796 gm. (a yield of 86%) of 5-methoxy-17α-methyl-des A-19-nor-$\Delta^{5,7,9}$-pregnatriene-20-ol having a melting point of 88° C. and a specific rotation $[\alpha]_D^{20}=-8.3°$ (c.=0.48% in methanol).

The product occurred in the form of colorless prisms soluble in most of the common organic solvents.

Analysis.—$C_{18}H_{26}O_2$; molecular weight=274.39. Calculated: C, 78.78%; H, 9.55%. Found: C, 78.9; H, 9.7.

Step C: Preparation of 17α-methyl-des A-19-nor-$\Delta^9$-pregnene-20-ol-5-one (a) *Birch reaction.*—280 cc. of anhydrous ammonia were condensed at a temperature of −70° C. and 65 mg. of lithium were added over a 15 minute period and the reaction mixture was agitated for an hour under an atmosphere of nitrogen. Then, 50 cc. of anhydrous ether were introduced into the mixture over a 15 minute period and then a solution of 1 gm. of 5-methoxy-17α-methyl-des A-19-nor-$\Delta^{5,7,9}$-pregnatriene-20-ol in 100 cc. of ether was added thereto. After the introduction was completed, the reaction mixture was maintained under gentle agitation for 3 hours. Next, 100 cc. of ethanol were added to the reaction mixture over a period of 30 minutes and the ammonia was removed therefrom with a bath of tepid water and a strong stream of nitrogen.

(b) *Hydrolysis.*—A solution of 50 gm. of oxalic acid in 250 cc. of aqueous ethanol containing 10% water was slowly added to the solution obtained above and the mixture was heated at an internal temperature of 50 to 55° C. for 10 minutes under an atmosphere of nitrogen, then was cooled and diluted with water. The mixture was extracted with methylene chloride and the organic phase was washed first with a saturated aqueous solution of sodium bicarbonate, then with water, dried and evaporated to dryness under vacuum. The residue obtained was subjected to chromatography through magnesium silicate and eluted with methylene chloride containing 10% acetone to obtain 828 mg. (a yield of 87%) of 17α-methyl-des A-19-nor-$\Delta^8$-pregnene-20-ol-5-one. This product was utilized as such for the next step of the synthesis.

(c) *Conjugation of 17α-methyl-des A-19-nor-$\Delta^8$-pregnene-20-ol-5-one.*—1.539 gm. of 17α-methyl-des A-19-nor-$\Delta^8$-pregnene-20-ol-5-one were dissolved in 40 cc. of ethanol and the solution was heated to an internal temperature of 50° C. with agitation. Next, 4 cc. of concentrated hydrochloric acid were added to the solution which was then agitated for several minutes, iced and poured into a mixture of a saturated aqueous solution of sodium bicarbonate and ice water. The reaction mixture was extracted with methylene chloride and the organic phase was recovered, washed with water until the wash waters were neutral, then dried and evaporated to dryness under vacuum. The residue obtained was recrystallized from refluxing isopropyl ether to obtain 870 mg. (a yield of 60%) of 17α-methyl-des A-19-nor-$\Delta^9$-pregnene-20-ol-5-one having a melting point of 170° C. and a specific rotation $[\alpha]_D^{20}=-45.5°$ (c.=0.44% in methanol).

The product occurred in the form of colorless prismatic needles which were slightly soluble in ether and soluble in alcohol, acetone, benzene and chloroform.

Analysis.—$C_{17}H_{16}O_2$. molecular weight=262.38. Calculated: C, 77.81%; H, 9.98%. Found: C, 77.9; H, 10.2.

Step D: Preparation of 17α-methyl-20-benzoyloxy-des A-19-nor-$\Delta^9$-pregnene-5-one 994 mg. of 17α-methyl-des A-19-nor-$\Delta^9$-pregnene-20-ol-5-one were dissolved in 6 cc. of pyridine under agitation and at a temperature of 0° C. and 2.25 cc. of benzoyl chloride was slowly added thereto. The reaction mixture was kept under agitation for 10 minutes and then it was allowed to stand overnight at a temperature of 5° C. Thereafter, a few drops of formic acid were added to the reaction mixture, which was agitated for ½ hour and then was poured into a saturated aqueous sodium bicarbonate solution. The reaction mixture was extracted with methylene chloride and the organic phase was recovered, washed successively with N hydrochloric acid, with water, with a saturated aqueous solution of sodium bicarbonate and again with water, and finally dried and evaporated under vacuum. The product obtained was recrystallized from refluxing isopropyl ether to obtain 1.195 gm. (a yield of 85%) of 17α-methyl-20-benzoyloxy-des A-19-nor-$\Delta^9$-pregnene-5-one having a melting point of 163° C. and a specific rotation $[\alpha]_D^{20}=-25.8°$ (c.=0.37% in methanol).

The product occurred in the form of colorless prismatic needles which were soluble in most of the usual organic solvents.

Analysis.—$C_{24}H_{30}O_3$; molecular weight=366.48. Calculated: C, 78.65%; H, 8.25%. Found: C, 78.6; H, 8.1.

In a similar manner, 17α-methyl-20-acetoxy-des A-19-nor-$\Delta^9$-pregnene-5-one was obtained proceeding in the following manner:

932 mg. of 17α-methyl-des A-19-nor-$\Delta^9$-pregnene-20-ol-5-one were dissolved in 4 cc. pyridine and then 2 cc. of acetic anhydride were added thereto after which the reaction mixture was agitated under an atmosphere of nitrogen for 20 hours at room temperature. The reaction mixture was poured into water and extracted with methylene chloride. The organic phase was recovered, successively washed with N hydrochloric acid, with water, with a saturated aqueous sodium bicarbonate solution and again with water. The organic phase was dried and evaporated to dryness under vacuum. The residue obtained was triturated in refluxing hexane to obtain 942 mg. (a yield of 87%) of 17α-methyl-20-acetoxy-des A-19-nor-$\Delta^9$-pregnene-5-one having a melting point of 180° C. and a specific rotation $[\alpha]_D^{20}=+6.4°\pm1$ (c.=0.44% in methanol).

The product occurred in the form of colorless prismatic needles which were soluble in most of the common organic solvents.

Analysis.—$C_{19}H_{28}O_3$; molecular weight=304.41. Calculated: C, 74.96%; H, 9.27%. Found: C, 75.0; H, 9.2.

Step E: Preparation of 5-pyrrolidyl-17α-methyl-20-benzoyloxy-des A-19-nor-$\Delta^{5(10),9(11)}$-pregnadiene 2.83 gm. of 17α-methyl-20-benzoyloxy-des A-19-nor-$\Delta^9$-pregnene-5-one were dissolved in 14 cc. of anydrous pyrrolidine and the resulting solution was refluxed for an hour under an atmosphere of nitrogen. The reaction mixture was iced and after 30 cc. of methanol were added thereto, the crystallization was initiated by scraping. After 2 hours, the crystallized mixture was vacuum filtered, washed with iced methanol and dried under vacuum to obtain 2.601 gm. (a yield of 80.5%) of 5-pyrrolidyl-17α-methyl - 20-benzoyloxy-des A-19-nor-$\Delta^{5(10),9(11)}$-pregnadiene having a melting point of 129° C.

The product obtained was utilized as such for the next step of the synthesis. The product occured in the form of yellow prisms which were slightly soluble in alcohol and soluble in benzene and chloroform.

Step F: Preparation of 3-chloro-17α-methyl-20-benzoyloxy-4,5-seco-19-nor-$\Delta^{2,9(10)}$-pregnadiene-5-one 15 gm. of potassium iodide were added to 150 cc. of anhydrous dimethylformamide. After dissolution, 25 cc.

of dimethylformamide were distilled off under an atmosphere of nitrogen and the solution was cooled to obtain a solution titrating 11.4 gm. of potassium iodide for 100 cc. of solution.

2.6 gm. of 5-pyrrolidyl-17α-methyl-20-benzoyloxy-des A-19-nor-$\Delta^{5(10),9(11)}$-pregnadiene were introduced into the solution prepared as indicated above and the reaction mixture was cooled to approximately 0° C. and agitated under an atmosphere of nitrogen and in total absence of light for 15 minutes. Thereafter, 0.82 cc. of anhydrous 1,3-dichloro-2-butene were added and the reaction mixture was agitated for 2½ hours in the total absence of light. After an addition of water, the reaction mixture was agitated at an internal temperature of 90 to 95° C. for 2 hours and then was cooled to room temperature. After extraction with methylene chloride, the organic phase which was recovered, was washed with water, then dried and evaporated under vacuum. The residue obtained was subjected to chromatography through silica gel and eluted with methylene chloride containing 0.5% of acetone to obtain 2.705 gm. (a yield of 97.5%) of 3-chloro-17α-methyl - 20-benzoyloxy-4,5-seco-19-nor-$\Delta^{2,9}$-pregnadiene-5-one. The product was utilized as such for the next step of the synthesis.

The product was soluble in most of the common organic solvents.

*Analysis.*—$C_{28}H_{35}O_3Cl$; molecular weight=455.02. Calculated: Cl, 7.7%. Found: Cl, 7.5.

*Step G: Preparation of 3-chloro-5-acetoxy-17α-methyl-20-benzoyloxy-4,5-seco-19-nor-$\Delta^{2,5(10),9(11)}$-pregnatriene*

2.05 gm. of 3-chloro-17α-methyl-20-benzoyloxy-4,5-seco-19-nor-$\Delta^{2,9}$-pregnadiene-5-one were introduced into 52 cc. of anhydrous toluene and after 8.2 cc. of acetic anhydride and 82 mg. of p-toluene sulfonic acid were added thereto, the reaction mixture was refluxed for a period of 5½ hours with agitation under an atmosphere of nitrogen. The reaction mixture was cooled and 20 cc. of a saturated aqueous sodium bicarbonate solution were added dropwise thereto and then 10 gm. of pulverized sodium bicarbonate were very slowly added. The agitation was maintained for one more hour at room temperature. Next, the reaction mixture was poured into water and the organic phase was separated, dried and evaporated to dryness under vacuum to obtain 2.265 gm. (practically quantitative yield) of 3-chloro-5-acetoxy-17α-methyl - 20-benzoyloxy-4,5-seco-19-nor-$\Delta^{2,5(10),9(11)}$-pregnatriene which was utilized as such for the next step of the synthesis.

*Step H: Preparation of 3-chloro-17α-methyl-20-benzoyloxy-4,5-seco-19-nor-$\Delta^{2,9,11}$-pregnatriene-5-one*

(A) *Bromination.*—2.255 gm. of 3-chloro-5-acetoxy-17α - methyl-20-benzoyloxy-4,5-seco-19-nor-$\Delta^{2,5(10),9(11)}$-pregnatriene were added to 23 cc. of anhydrous dimethylformamide and the mixture was agitated under an atmosphere of nitrogen. To the resulting solution 1.5 gm. of sodium acetate were added first and then over a period of 4 hours, 9.6 cc. of a solution of bromine in dimethyl formamide, titrating 10.5 gm. of bromine per 100 cc. of solution, were added. After the introduction was completed, the reaction mixture was agitated for an hour at room temperature and then poured into ice water. The organic phase was extracted with methylene chloride and the methylene extract was first washed with a saturated aqueous sodium bicarbonate solution and then with water until the wash waters were neutral, dried and evaporated to dryness under vacuum to obtain 3-chloro-11-bromo-17α - methyl - 20-benzoyloxy-4,5-seco-19-nor-$\Delta^{2,9}$-pregnadiene-5-one which was utilized as such for the next step of the synthesis.

(B) *Dehydrobromination.*—3 - chloro - 11-bromo-17α-methyl - 20-benzoyloxy-4,5-seco-19-nor-$\Delta^{2,9}$-pregnadiene-5-one obtained as described above was introduced into 40 cc. of anhydrous dimethylformamide and 2.255 gm. of lithium bromide and 2.255 gm. of lithium carbonate were added thereto. The reaction mixture was heated for 18 hours at about 110° C. while agitating under an atmosphere of nitrogen. After cooling, the reaction mixture was poured into a mixture of 75 cc. of iced water, 40 cc. of methylene chloride and 5 cc. of acetic acid and agitated for a few minutes. The organic layer was separated, washed with water, dried and evaporated to dryness under vacuum. The residue obtained was subjected to chromatography through magnesium silicate and was eluted with methylene chloride to obtain 1.039 gm. (a yield of 51%) of 3-chloro-17α-methyl-20-benzoyloxy-4,5 - seco - 19 - nor-$\Delta^{2,9,11}$-pregnatriene-5-one which was utilized as such for the next step of the synthesis.

The product was soluble in most of the common organic solvents.

*Step I: Preparation of 3-chloro-17α-methyl-4,5-seco-19-nor-$\Delta^{2,9,11}$-pregnatriene-20-ol-5-one*

1.025 gm. of 3-chloro-17α-methyl-20-benzoyloxy-4,5-seco-19-nor-$\Delta^{2,9,11}$-pregnatriene-5-one were dissolved in 3 cc. of anhydrous methanol and 25 cc. of an N methanolic potassium hydroxide solution prepared by starting with 8 cc. of a 48° Baumé potassium hydroxide solution in methanol in a quantity sufficient to obtain 100 cc. of solution were added thereto. Next, the reaction mixture was heated at reflux for 8 hours while agitating under an atmosphere of nitrogen. After cooling the reaction mixture was poured into ice water and the organic phase was extracted with methylene chloride. The methylene chloride extract was washed with water until the wash waters were neutral, then dried and evaporated to dryness under vacuum. The residue obtained was subjected to chromatography through magnesium silicate and was eluted with methylene chloride containing 0.5% of acetone to obtain 513 mg. (a yield of 65%) of 3-chloro-17α-methyl-4,5-seco-19-nor-$\Delta^{2,9,11}$-pregnatriene-20-ol-5-one. The product was utilized as such for the next step of the synthesis.

The product was soluble in alcohol, ether, acetone, benzene and chloroform.

*Step J: Preparation of 3-chloro-17α-methyl-4,5-seco-19-nor-$\Delta^{2,9,11}$-pregnatriene-5,20-dione*

500 gm. of 3-chloro-17α-methyl-4,5-seco-19-nor-$\Delta^{2,9,11}$-pregnatriene-20-ol-5-one were dissolved into 50 cc. of anhydrous acetone and the solutoin was cooled to about 0°. C. at agitation under an atmosphere of nitrogen. Over a period of 30 minutes, 1.4 cc. of a sulfochromic acid solution prepared from 1.03 gm. of chromium trioxide, 10 cc. of water and 1 cc. of sulfuric acid was added thereto and the reaction mixture was then agitated for 2½ hours at room temperature. After an addition of 5 cc. of a saturated aqueous sodium bicarbonate solution, the mixture was filtered and the organic phase was extracted with methylene chloride. The methylene chloride extract was washed with water until the wash waters were neutral, dried and evaporated to dryness under vacuum to obtain 501 gm. (quantitative yield) of 3-chloro-17α-methyl-4,5-seco-19-nor-$\Delta^{2,9,11}$-pregnatriene - 5,20 - dione. The product was utilized as such for the next step of the synthesis.

The product was soluble in most of the usual organic solvents.

*Step K: Preparation of 17α-methyl-4,5-seco-19-nor-$\Delta^{9,11}$-pregnadiene-3,5,20-trione*

2.5 cc. of sulfuric acid were cooled to about 0° C. and a solution of 493 mg. of 3-chloro-17α-methyl-4,5-seco-19-nor-$\Delta^{2,9,11}$-pregnatriene-5,20-dione in 0.5 cc. of methylene chloride were added thereto over a period of 10 minutes while agitating under an atmosphere of nitrogen. After the introduction was completed, the reaction mixture was agitated for about 10 minutes at a temperature of about 3° C. and then the reaction mixture was poured into a mixture of 25 cc. of methylene chloride, 25 cc. of a saturated aqueous sodium bicarbonate solution and 25 cc. of ice water. The organic phase was separated, washed with water, dried and evaporated to dryness under vacuum. The residue obtained was subjected to chromatography through magnesium silicate and was eluted first with methylene chloride containing 2.5% of acetone and then with 5% acetone to obtain 401 mg. of 17α-methyl-4,5-seco-19-nor-Δ$^{9,11}$-pregnadiene-3,5,20-trione having a melting point of 152° C. The product was utilized as such for the next step of the synthesis.

The product was soluble in alcohol, ether, acetone, benzene and chloroform.

*Step L: Preparation of 17α-methyl-19-nor-Δ$^{4,9,11}$-pregnatriene-3,20-dione*

Under an atmosphere of nitrogen, 2.8 gm. of sodium were introduced into 40 cc. of anhydrous toluene and the solution was heated to reflux. Next, 12.5 cc. of anhydrous tertiary amyl alcohol were added to the reaction mixture under agitation and the mixture was maintained at reflux for 19½ hours. Then, the reaction mixture was cooled to obtain a solution of sodium tert.-amylate which titrates at 1.48 N. 390 mg. of 17α-methyl-4,5-seco-19-nor-Δ$^{9,11}$-pregnadiene-3,5,20-trione were added to 7.8 cc. of anhydrous toluene while agitating under an atmosphere of nitrogen. After cooling the reaction mixture to about 0° C. 0.4 cc. of the 1.48 N sodium tert.-amylate solution admixed with 4 cc. of toluene was added thereto and the reaction mixture was agitated for a period of 6 hours. Thereafter, 0.04 cc. of acetic acid and 4 cc. of toluene were introduced into the reaction mixture which was then extracted with methylene chloride. The methylene chloride extract was washed with water until the wash waters were neutral, dried and evaporated to dryness under vacuum. The residue obtained was subjected to chromatography through magnesium silicate and was eluted with methylene chloride containing 2.5% of acetone to obtain 318 mg. of product which was recrystallized from refluxing isopropyl ether to obtain 230 mg. (a yield of 62.5%) of 17α-methyl-19-nor-Δ$^{4,9,11}$-pregnatriene-3,20-dione having a melting point of 82° C. and a specific rotation [α]$_D^{20}$=—56° (c.=0.35% in dioxane).

The product occurred in the form of yellow prisms which were soluble in alcohol, ether, acetone, benzene and chloroform.

*Analysis.*—$C_{21}H_{26}O_2$; molecular weight=310.42. Calculated: C, 81.24%; H, 8.44%. Found: C, 81.1; H. 8.5.

PHARMACOLOGICAL STUDY OF 17α-METHYL-19-NOR-Δ$^{4,9,11}$-PREGNATRIENE-3,20-DIONE (1) *Determination of the progestomimetic activity.*—The progestomimetic activity of 17α-methyl-19-nor-Δ$^{4,9,11}$-pregnatriene-3,20-dione was ascertained by the Clauberg test conducted on rabbits under the age of puberty which were previously sensitized by subcutaneous administration of estradiol benzoate for 5 days at a daily dose of 10 μg. The said compound was utilized as a solution in olive oil admixed with 5% benzylic alcohol which was orally administered for 5 days at daily doses of 50, 100 and 200 μg. The animals were sacrificed on the sixth day and the lace-like proliferation of the endometrium on the sections of the uterus was observed which reproduction is characteristic of progestomimetic action. The following results expressed in MacPhail units were obtained.

MacPhail units:
  at 50 μg. _____ 0
  at 100 μg. _____ 1.4
  at 200 μg. _____ 2.4

At an orally administered dose of 200 μg. the compound of the invention exercised the same progestomimetic action as progesterone utilized at the same dose administered subcutaneously. Under the same conditions at a dose of 1 mg. in the Clauberg test, 19-nor-progesterone per os yielded 1.9 in MacPhail units.

(2) *Gestative action-test for the maintenance of gestation.*—This test was based on the fact that abortion, which is the rule in rabbits subjected to ovariectomy during the gestation, may be avoided by a suitable treatment replacing the ovarian hormones. Rabbits, castrated on the 14th day of their gestation, were utilized and were treated daily from the 13th to the 27th day either with oral or subcutaneous administration. The product was administered as a solution in oil admixed with 5% benzylic alcohol and the animals were sacrified on the 28th day. At the autopsy the living fetuses and the normal and the macerated placentae were counted, the latter corresponding to abortions. With subcutaneous administration, the results showed that 17α-methyl-19-nor-Δ$^{4,9,11}$-pregnatriene-3,20-dione brought on maintenance of the subtotal gestation at a dose of 0.5 mg. per day whereas progesterone presented the same result only at a dose of 10 mg. per day.

The compositions and method of the invention may be varied without departing from the spirit or scope thereof and it is to be understood that the invention is to be limited only as defined in the appended claims.

We claim:
1. A compound of the formula

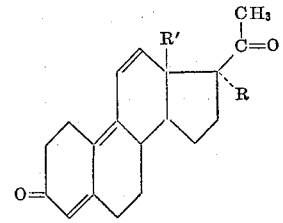

wherein R and R' are alkyl of 1 to 4 carbon atoms.

2. A compound of claim 1 wherein R and R' are both methyl.

3. A process for the preparation of 19-nor-Δ$^{4,9,11}$-steroids of the formula

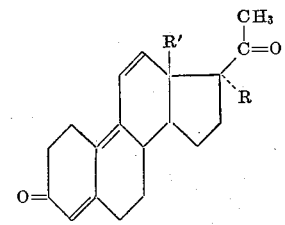

wherein R and R' are alkyl of 1 to 4 carbon atoms which comprises reacting 5-methoxy-13β-R'-des-A-18,19-dinor-Δ$^{5,7,9,16}$-pregnatetraene-20-one wherein R' has the above definition with an alkyl halide wherein the alkyl is R of the above definition in the presence of a metal selected from the group consisting of alkali metals and alkaline earth metals in liquid ammonia to form 5-methoxy-13β-R'-17α-R-des A-18,19-dinor-Δ$^{5,7,9}$-pregnatriene-20-one, reducing the latter with a mixed metal hydride to form 5-methoxy-13β-R'-17α-R-des A-18,19-dinor-Δ$^{5,7,9}$-pregnatriene-20-ol, subjecting the latter to a Birch reduction followed by mild acidic hydrolysis to form 13β-R'-17α-R-des A-18,19-dinor-Δ$^8$-pregnene-20-ol-5-one, reacting the latter with a concentrated mineral acid to form 13β-R'-17α-R-des A-18,19-dinor-Δ$^9$-pregnene-20-ol-5-one, esterifying the latter to form 13β-R'-17α-R-des A-18,19-dinor-20-acyloxy-Δ$^9$-pregnene-5-one wherein the acyl radical is derived from an organic carboxylic acid of 1 to 18 carbon atoms, reacting the latter with a cyclic amine of the formula

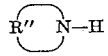

wherein R'' is an alkylene of 4 to 7 carbon atoms to form the corresponding 5-enamino-13β-R'-17α-R-des-A-18,19-dinor-20-acyloxy-Δ$^{5(10),9(11)}$-pregnadiene, condensing the latter with 1,3-dichloro-2-butene to form 3-chloro- 13β - R' - 17α - R - 20 - acyloxy-4,5-seco-18,19-dinor-$\Delta^{2,9}$-pregnadiene-5-one, converting the latter into its enolic acetate, brominating the latter to form 3-chloro-11-bromo-13β - R' - 17α - R - 20 - acyloxy-4,5-seco-18,19-dinor-$\Delta^{2,9}$-pregnadiene-5-one, dehydrobrominating the latter to form 3-chloro-13β-R'-17α-R-20-acyloxy-4,5-seco - 18,19 - dinor-$\Delta^{2,9,11}$-pregnatriene-5-one, saponifying the latter to form 3 - chloro - 13β - R' - 17α - R-4,5-seco-18,19-dinor-$\Delta^{2,9,11}$-pregnatriene-20-ol-5-one, oxidizing the latter to form 3-chloro-13β-R'-17α-R-4,5-seco-18,19-dinor-$\Delta^{2,9,11}$ - pregnatriene-5,20-dione, subjecting the latter to acid hydrolysis to form 13β-R'-17α-R-4,5-seco-18,19-dinor-$\Delta^{9,11}$-pregnadiene-3,5,20-trione and cyclizing the latter with a dehydrating agent to form the 13β-R'-17α-R-18,19-dinor-$\Delta^{4,9,11}$-pregnatriene-3,20-dione.

4. 17α-methyl-des A-19-nor-$\Delta^8$-pregnene-20-ol-5-one.

5. 3 - chloro-17α-methyl-4,5-seco-19-nor-$\Delta^{2,9,11}$-pregnatriene-20-ol-5-one.

6. 3-chloro-17α-methyl-4,5-seco-19-nor-$\Delta^{2,9,11}$ - pregnatriene-5,20-dione.

7. 17α - methyl - 4,5-seco-19-nor-$\Delta^{9,11}$-pregnadiene-3,5-20-trione.

8. A composition for maintaining pregnancy in mammals comprised of at least one 19-nor-$\Delta^{4,9,11}$-steroids of the formula

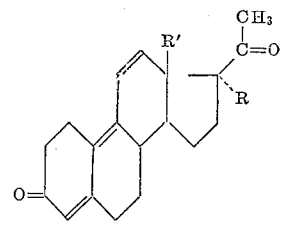

wherein R and R' are lower alkyl of 1 to 4 carbon atoms and a major amount of a pharmaceutical carrier.

9. A method of maintaining pregnancy which comprises administering to pregnant mammals an effective amount of 17α-methyl-19-nor-$\Delta^{4,9,11}$-pregnatriene-3,20-dione.

10. The method of claim 9 wherein the amount is 5 to 25 mg.

References Cited
UNITED STATES PATENTS

3,248,294   4/1966   Nomine et al. _____ 167—74
3,257,278   6/1966   Nomine et al. _____ 167—74

ELBERT L. ROBERTS, *Primary Examiner.*